(12) United States Patent
Kang

(10) Patent No.: US 9,519,364 B2
(45) Date of Patent: Dec. 13, 2016

(54) TOUCH SCREEN SENSING DEVICE AND METHOD FOR SENSING TOUCH SCREEN

(71) Applicant: LG DISPLAY CO., LTD., Seoul (KR)

(72) Inventor: Hyeongwon Kang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 247 days.

(21) Appl. No.: 13/689,184

(22) Filed: Nov. 29, 2012

(65) Prior Publication Data

US 2013/0141372 A1 Jun. 6, 2013

(30) Foreign Application Priority Data

Dec. 5, 2011 (KR) ......................... 10-2011-0129032

(51) Int. Cl.
*G06F 3/044* (2006.01)
*G06F 3/041* (2006.01)

(52) U.S. Cl.
CPC .............. *G06F 3/041* (2013.01); *G06F 3/044* (2013.01); *G06F 3/0416* (2013.01)

(58) Field of Classification Search
CPC ........ G06F 3/041; G06F 3/0416; G06F 3/044; G06F 3/0304; G06F 3/033; G06F 3/042; G06F 3/0436; G06F 3/03547; G06F 3/0412; G01R 19/2513; G01R 21/06; G11C 27/026; H04B 1/3833; H04W 52/18; H04W 52/288
USPC ..................... 345/156–184; 178/18.01–20.03
See application file for complete search history.

(56) References Cited

U.S. PATENT DOCUMENTS

| | | | |
|---|---|---|---|
| 4,857,721 A * | 8/1989 | Dunavan et al. .......... 250/206.1 |
| 6,075,520 A * | 6/2000 | Inoue ...................... G06F 3/044 178/18.01 |
| 6,437,608 B1* | 8/2002 | Miyabe et al. ................. 327/96 |
| 8,338,724 B2* | 12/2012 | Reynolds ................... 178/18.06 |
| 2006/0125678 A1* | 6/2006 | Kinyua et al. ................ 341/161 |
| 2008/0309623 A1* | 12/2008 | Hotelling ............... C12N 15/86 345/173 |
| 2009/0273579 A1* | 11/2009 | Zachut et al. ................ 345/174 |
| 2010/0327889 A1* | 12/2010 | Matsubara .............. G06F 3/044 324/705 |
| 2011/0074732 A1* | 3/2011 | Reynolds ................ G06F 3/041 345/174 |
| 2011/0084928 A1* | 4/2011 | Chang ................ G01R 27/2605 345/173 |
| 2011/0163233 A1* | 7/2011 | Ng et al. ..................... 250/338.4 |
| 2011/0242048 A1* | 10/2011 | Guedon et al. ............... 345/174 |
| 2011/0316776 A1* | 12/2011 | Ong ...................... G06F 3/0304 345/158 |

(Continued)

*Primary Examiner* — Premal Patel
*Assistant Examiner* — Gloryvid Figueroa-Gibson
(74) *Attorney, Agent, or Firm* — Brinks Gilson & Lione

(57) ABSTRACT

A touch screen sensing device includes a touch screen including touch sensors formed at crossings of Tx lines and Rx lines, a Tx driving circuit supplying a driving pulse to each of the Tx lines N times, and an Rx driving circuit which samples a signal voltage of the touch sensors received through the Rx lines and converts the sampled signal voltage into digital data. The Rx driving circuit includes a differential amplifier differentially amplifying signals received through the Rx lines, a low pass filter removing a radio frequency noise from an output of the differential amplifier, an amplifier amplifying an output of the low pass filter, and an integrator accumulating signal voltages which are successively output from the amplifier.

6 Claims, 8 Drawing Sheets

(56) References Cited

U.S. PATENT DOCUMENTS

| | | | |
|---|---|---|---|
| 2012/0169631 A1* | 7/2012 | Ahn | G06F 3/044 |
| | | | 345/173 |
| 2013/0222335 A1* | 8/2013 | Lee et al. | 345/174 |
| 2015/0035794 A1* | 2/2015 | Zhitomirskiy | G06F 3/044 |
| | | | 345/174 |

* cited by examiner

TOUCH SCREEN SENSING DEVICE AND METHOD FOR SENSING TOUCH SCREEN

This application claims the benefit of Korean Patent Application No. 10-2011-0129032 filed on Dec. 5, 2011, the entire contents of which is incorporated herein by reference for all purposes as if fully set forth herein.

BACKGROUND

Field of the Disclosure

Embodiments of the disclosure relate to a touch screen sensing device and a method for sensing a touch screen.

Discussion of the Related Art

A user interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously expanded to increase user's sensibility and handling convenience. A touch UI, a voice recognition UI, a 3D UI, etc. have been recently developed as the user interface.

The touch UI has been necessarily used in portable information appliances and has been expanded to the use of home appliances. There is a mutual capacitance touch screen as an example of a touch screen for implementing the touch UI. The mutual capacitance touch screen has been spotlighted because it can perform the sensing of proximity input as well as the sensing of touch input and also can recognize respective touch locations of a multi-touch (or multi-proximity) operation.

A method for sensing the touch screen includes supplying a driving voltage to touch sensors of the touch screen to generate charges from a mutual capacitance of the touch sensors, converting a charge change amount of the mutual capacitance into a voltage change amount, and comparing a voltage change amount before and after a touch operation with a reference voltage or counting the voltage change amount. Other methods have been known. As a method for reducing an influence of a noise mixed in the touch sensors of the mutual capacitance touch screen, there is a method for removing DC offset included in the voltage of the touch sensor received using a digital-to-analog converter (DAC).

When the touch screen receives the voltage of the touch sensor through a Rx channel, the voltage of the Rx channel changes sensitively because of a parasitic capacitance between adjacent Rx channels. In the mutual capacitance touch screen, a signal-to-noise ratio (often abbreviated SNR or S/N) of a signal received through the Rx channel is reduced because of a common mode noise, for example, a driving signal of a display panel. The touch screen is easily affected by a radio frequency noise received from the display panel or other peripheral elements. The radio frequency noise applied to the Tx and Rx channels of the touch screen further reduces the signal-to-noise ratio of the signal received through the Rx channel. Thus, the related art method for sensing the touch screen may wrongly recognize the touch input or may hardly recognize the accurate touch position because of the parasitic capacitance of the touch screen and the low signal-to-noise ratio.

SUMMARY

A touch screen sensing device including a touch screen includes Tx lines, Rx lines crossing the Tx lines, and touch sensors formed at crossings of the Tx lines and the Rx lines, a Tx driving circuit configured to supply a driving pulse to each of the Tx lines N times, where N is a positive integer equal to or greater than 2, and an Rx driving circuit configured to sample a signal voltage of the touch sensors received through the Rx lines and convert the sampled signal voltage into digital data.

The Rx driving circuit includes a differential amplifier configured to differentially amplify signals received through the adjacent Rx lines, a low pass filter configured to remove a radio frequency noise from an output of the differential amplifier, an amplifier configured to amplify an output of the low pass filter, and an integrator configured to accumulate signal voltages which are successively output from the amplifier.

In another aspect, a method for sensing a touch screen includes Tx lines, Rx lines crossing the Tx lines, and touch sensors formed at crossings of the Tx lines and the Rx lines, the method including supplying a driving pulse to each of the Tx lines N times, where N is a positive integer equal to or greater than 2, differentially amplifying signals received through the adjacent Rx lines, removing a radio frequency noise from an output of a differential amplifier using a low pass filter, amplifying an output of the low pass filter, and successively receiving amplified signals to accumulate the amplified signals.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
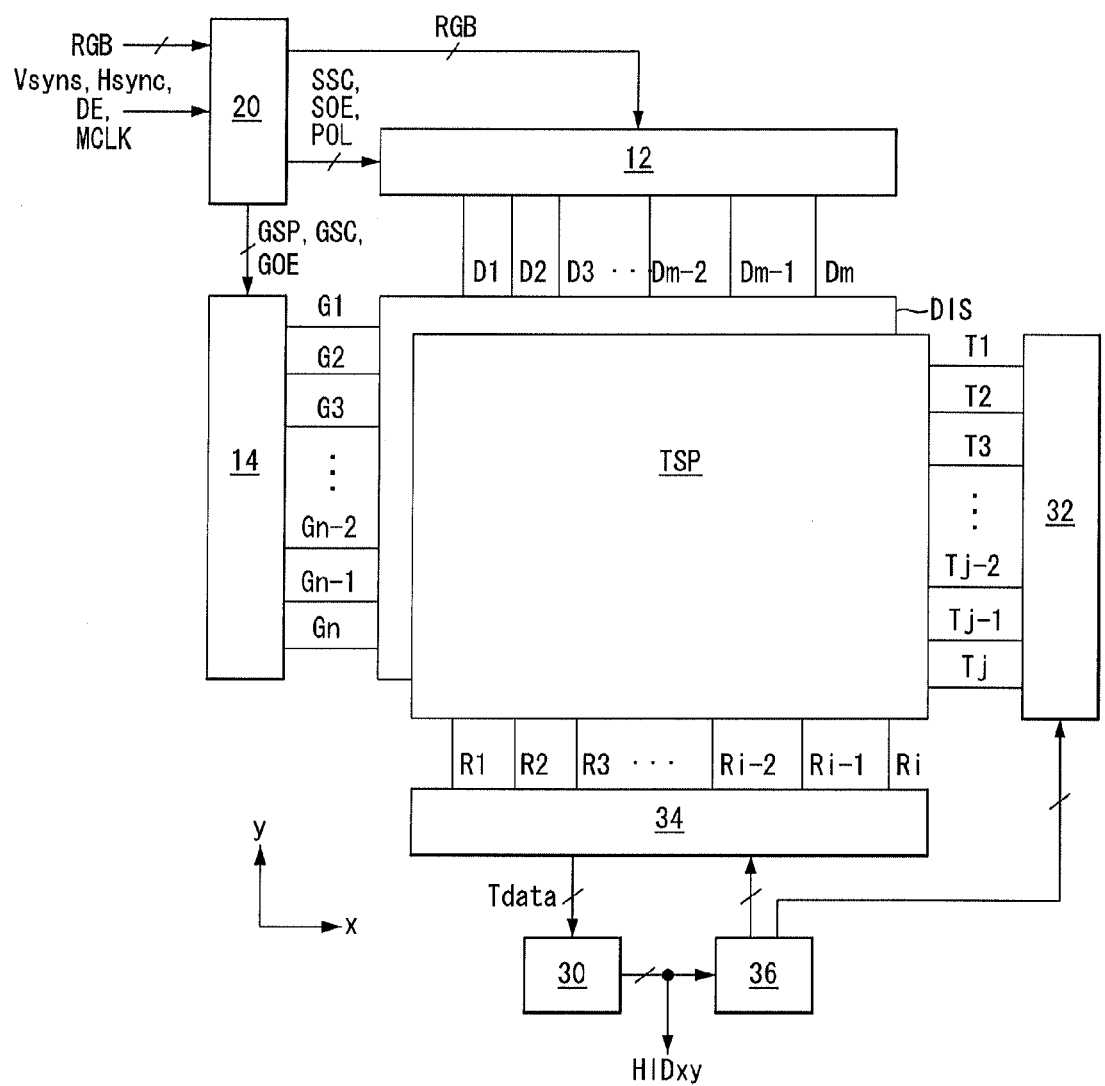
FIG. 1 is a block diagram of a touch screen sensing device according to an example embodiment of the invention.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

As shown in FIGS. 1 to 4, a display device according to an example embodiment of the invention includes a display panel DIS, a display driving circuit, a display timing controller 20, a touch screen TSP, a touch screen driving circuit, a touch recognition algorithm execution unit 30, etc. All components of the display device are operatively coupled and configured.

The display device according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

The display panel DIS includes a lower glass substrate GLS2, an upper glass substrate GLS1, and a liquid crystal layer formed between the lower glass substrate GLS2 and the upper glass substrate GLS1. The lower glass substrate GLS2 of the display panel DIS includes a plurality of data lines D1 to Dm, where m is a natural number, a plurality of gate lines (or scan lines) G1 to Gn crossing the data lines D1 to Dm, where n is a natural number, a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, etc.

Pixels of the display panel DIS are respectively formed in pixel areas defined by the data lines D1 to Dm and the gate lines G1 to Gn to form a matrix structure. The liquid crystal cell of each pixel is driven by an electric field generated depending on a voltage difference between the data voltage supplied to the pixel electrode and a common voltage supplied to a common electrode, thereby adjusting an amount of incident light transmitted by the liquid crystal cell. The TFTs are turned on in response to a gate pulse (or a scan pulse) from the gate lines G1 to Gn, thereby supplying the voltage from the data lines D1 to Dm to the pixel electrodes of the liquid crystal cells.

The upper glass substrate GLS1 of the display panel DIS may include black matrixes, color filters, etc. The lower glass substrate GLS2 of the display panel DIS may be configured in a COT (color filter on TFT) structure. In this instance, the black matrixes and the color filters may be formed on the lower glass substrate GLS2 of the display panel DIS.

Polarizing plates POL1 and POL2 are respectively attached to the upper and lower glass substrates GLS1 and GLS2 of the display panel DIS. Alignment layers for setting a pre-tilt angle of liquid crystals are respectively formed on the inner surfaces contacting the liquid crystals in the upper and lower glass substrates GLS1 and GLS2 of the display panel DIS. A column spacer may be formed between the upper and lower glass substrates GLS1 and GLS2 of the display panel DIS to keep cell gaps of the liquid crystal cells constant.

A backlight unit may be disposed under a back surface of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12, a scan driving circuit 14, and a display timing controller 20. The display driving circuit applies a video data voltage of an input image to the pixels of the display panel DIS. The data driving circuit 12 converts digital video data RGB received from the display timing controller 20 into positive and negative analog gamma compensation voltages and outputs the data voltage. The data driving circuit 12 then supplies the data voltage to the data lines D1 to Dm. The scan driving circuit 14 sequentially supplies the gate pulse synchronized with the data voltage to the gate lines G1 to Gn and selects lines of the display panel DIS to which the data voltage will be applied.

The display timing controller 20 receives timing signals, such as a vertical sync signal Vsync, a horizontal sync signal Hsync, a data enable DE, and a main clock MCLK, from an external host system. The display timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable SOE, a polarity control signal POL, etc. The scan timing control signal includes a gate start pulse GSP, a gate shift clock GSC, a gate output enable GOE, etc.

Figure 2:
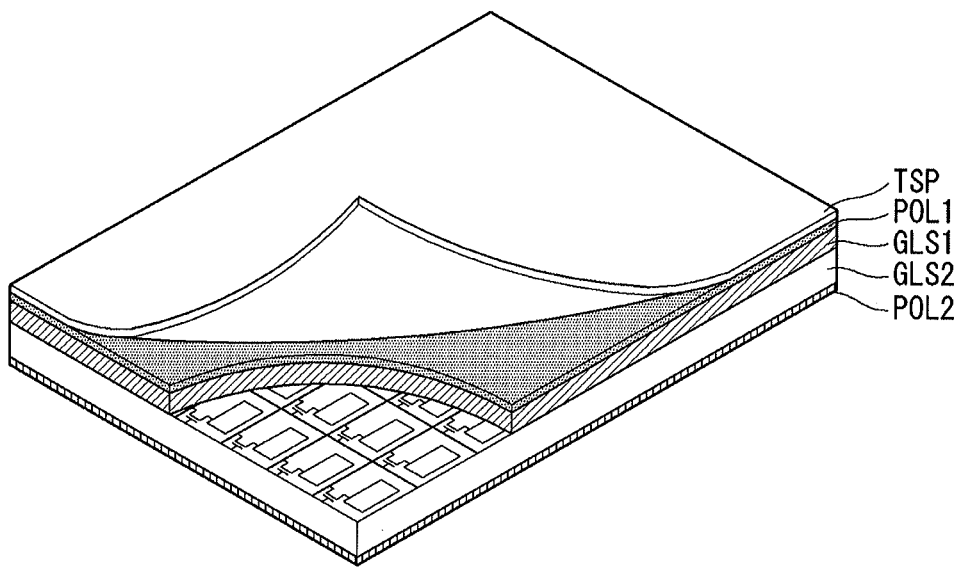
FIGS. 2 to 4 illustrate various combinations of a touch screen and a display panel according to an example embodiment of the invention.
Figure 3:
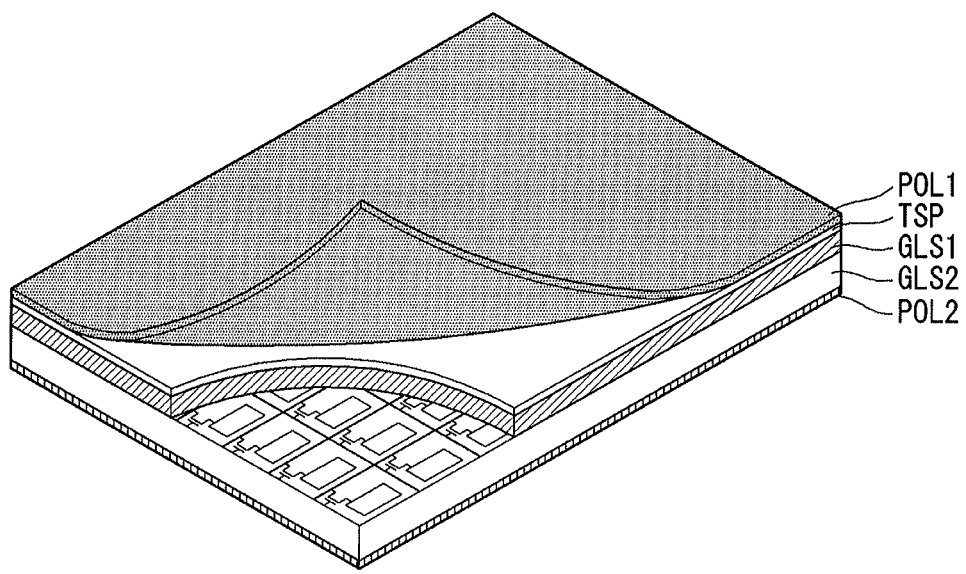
Figure 4:
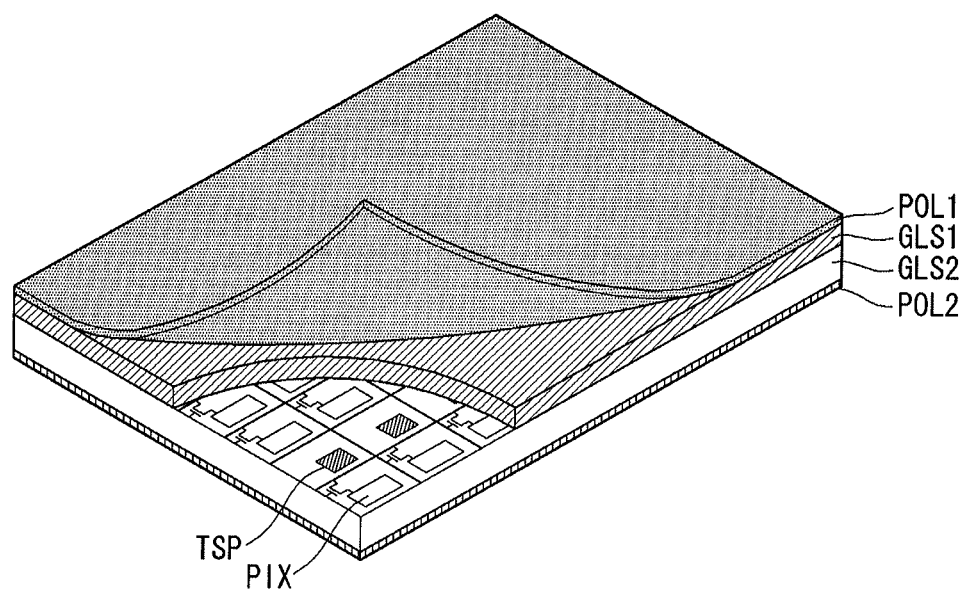

As shown in FIG. 2, the touch screen TSP may be attached on the upper polarizing plate POL1 of the display panel DIS. Alternatively, as shown in FIG. 3, the touch screen TSP may be formed between the upper polarizing plate POL1 and the upper glass substrate GLS1. Alternatively, as shown in FIG. 4, touch sensors of the touch screen TSP may be formed on the lower glass substrate GLS2 along with a pixel array of the display panel DIS in an in-cell manner. In FIGS. 2 to 4, 'PIX' denotes the pixel electrode of the liquid crystal cell.

Figure 6:
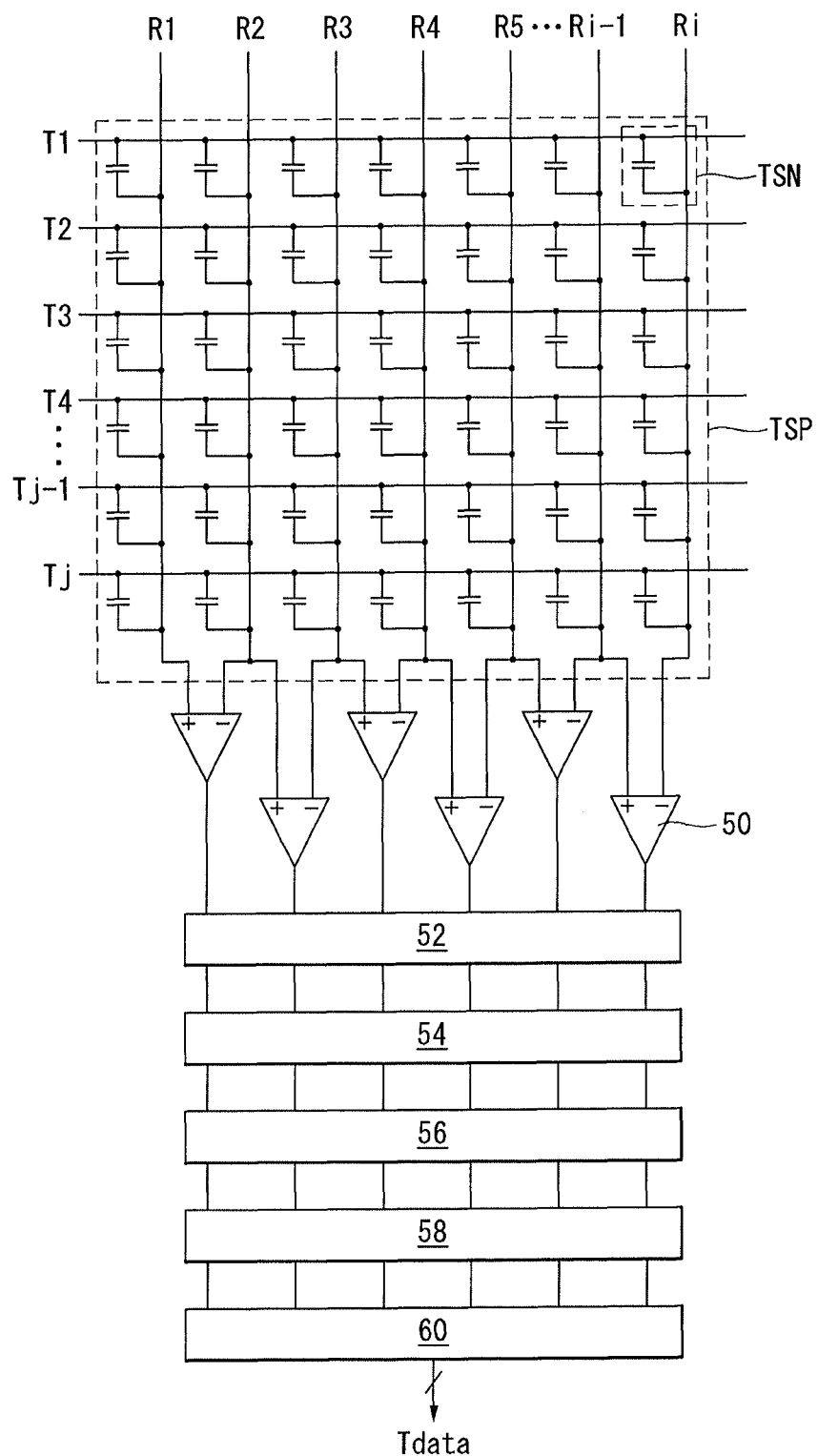
FIG. 6 is a block diagram illustrating in detail a circuit configuration of an Rx driving circuit shown in FIG. 1.

As shown in FIG. 6, the touch screen TSP includes Tx lines T1 to Tj, where j is a positive integer less than n, Rx lines R1 to Ri crossing the Tx lines T1 to Tj, where i is a positive integer less than m, and i×j touch sensors TSN formed at crossings of the Tx lines T1 to Tj and the Rx lines R1 to Ri. Each of the touch sensors TSN has a mutual capacitance.

The touch screen driving circuit supplies a driving pulse to the Tx lines T1 to Tj and receives voltages (i.e., touch sensor voltages) of the touch sensors through the Rx lines R1 to Ri in synchronization with the driving pulse. The touch screen driving circuit includes a Tx driving circuit 32, an Rx driving circuit 34, and a touch screen timing controller (hereinafter referred to as a "TSP timing controller") 36. The Tx driving circuit 32, the Rx driving circuit 34, and the TSP timing controller 36 may be integrated in one readout integrated circuit (ROIC) 40.

Figure 7:
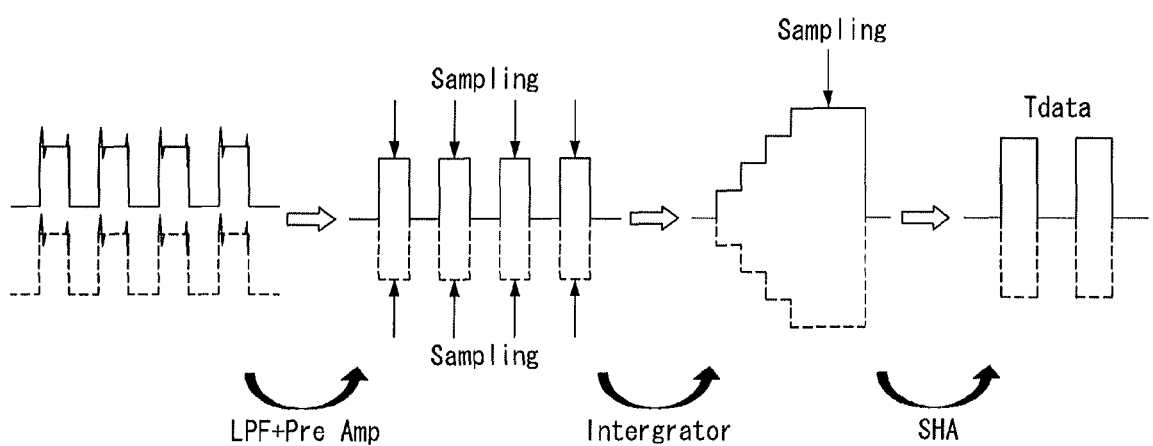
FIG. 7 is a waveform diagram illustrating outputs of a low pass filter, a pre-amplifier, an integrator, and a sampling circuit in an Rx driving circuit shown in FIG. 6.

The Tx driving circuit 32 selects a Tx channel, which will output the driving pulse, in response to a Tx setup signal input from the TSP timing controller 36 and supplies the driving pulse to the Tx lines T1 to Tj connected to the selected Tx channel. As shown in FIG. 7, the driving pulse is supplied to each of the Tx lines T1 to Tj N times, where N is a positive integer equal to or greater than 2, so that a signal voltage received through an Rx channel may be accumulated by an integrator.

As shown in FIG. 6, the Rx lines R1 to Ri are connected to the Rx channels of the Rx driving circuit 34 through differential amplifiers 50. Each differential amplifier 50 amplifies a difference between voltage of the adjacent Rx lines and outputs a positive signal and a negative signal having a potential difference corresponding to the difference between voltage of the adjacent Rx lines. Each differential amplifier 50 amplifies a difference between voltage of the adjacent Rx lines, thereby reducing a noise component resulting from a parasitic capacitance of the touch screen TSP. Hence, the differential amplifiers 50 improve a signal-to-noise ratio (often abbreviated SNR or S/N). Each differential amplifier 50 may be implemented as a fully differential amplifier, which outputs voltages of positive and negative signals having a complementary relation.

The Rx driving circuit 34 selects the Rx channel to receive the touch sensor voltage in response to an Rx setup signal input from the TSP timing controller 36. The Rx driving circuit 34 receives the positive and negative signals amplified by the differential amplifiers 50 through the Rx lines R1 to Ri connected to the selected Rx channel and increases a signal-to-noise ratio of the received positive and negative signals through a low pass filter (LPF), a pre-amplifier (pre-amp), and an integrator. Further, the Rx driving circuit 34 samples an output voltage of the integrator and then converts the sampled output voltage into digital data. The digital data output from the Rx driving circuit 34 is touch raw data Tdata and is transmitted to the touch recognition algorithm execution unit 30.

The TSP timing controller 36 generates the Tx setup signal for setting the Tx channel to output the driving pulse through the Tx driving circuit 32 and the Rx setup signal for setting the Rx channel to receive the touch sensor voltage through the Rx driving circuit 34. Further, the TSP timing controller 36 generates timing control signals for controlling operation timings of the Tx driving circuit 32 and the Rx driving circuit 34.

The touch recognition algorithm execution unit 30 analyzes a previously determined touch recognition algorithm and analyzes the touch raw data Tdata input from the Rx driving circuit 34. Hence, the touch recognition algorithm execution unit 30 compares the touch raw data with a predetermined reference value, and determines touch raw data, in which a change amount of the touch sensor voltage before and after the touch operation is equal to or greater than the predetermined reference value, as data of touch (or proximity) input. Then, the touch recognition algorithm execution unit 30 estimates coordinates of a position of the touch (or proximity) input and outputs touch map data HIDxy including the position coordinates of the touch (or proximity) input. The map data HIDxy output from the touch recognition algorithm execution unit 30 is transmitted to the host system. The touch recognition algorithm execution unit 30 may be implemented as a microcontroller unit (MCU).

The host system may be implemented as one of a navigation system, a set-top box, a DVD player, a Blu-ray player, a personal computer (PC), a home theater system, a broadcasting receiver, and a phone system. The host system includes a system on chip (SoC), in which a scaler is embedded, and thus converts image data into a format suitable for displaying on the display panel DIS. Also, the host system runs an application associated with a coordinate value of the touch data input from the touch recognition algorithm execution unit 30.

Figure 5:
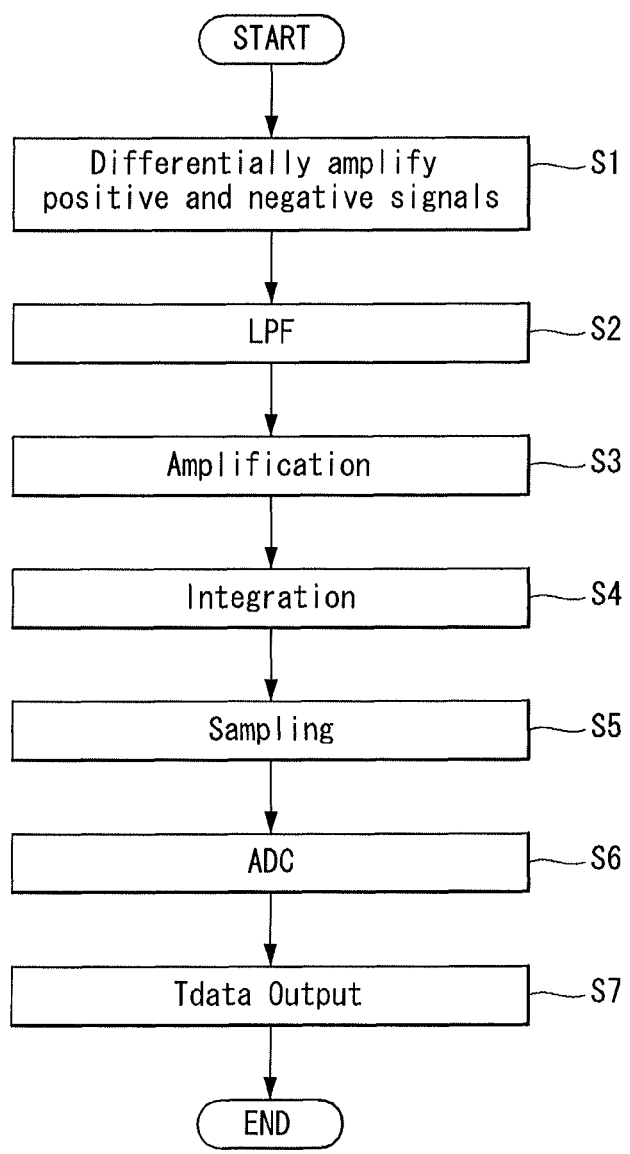
FIG. 5 is a flow chart sequentially illustrating an operation of an Rx driving circuit shown in FIG. 1.

FIG. 5 is a flow chart sequentially illustrating an operation of the Rx driving circuit 34 shown in FIG. 1. FIG. 6 is a block diagram illustrating in detail a circuit configuration of the Rx driving circuit 34 shown in FIG. 1. FIG. 7 is a waveform diagram illustrating outputs of a low pass filter, a pre-amplifier, an integrator, and a sampling circuit in the Rx driving circuit 34 shown in FIG. 6.

As shown in FIGS. 5 to 7, the Rx driving circuit 34 includes a low pass filter 52, a pre-amplifier 54, an integrator 56, a sampling circuit 58, and an analog to digital converter (ADC) 60.

Each of the low pass filter 52, the pre-amplifier 54, the integrator 56, and the sampling circuit 58 inputs and outputs a signal through a fully differential amplifier. In FIG. 7, the solid line is a positive signal of the fully differential amplifier, and the dotted line is a negative signal of the fully differential amplifier.

As shown in FIG. 5, the low pass filter 52 receives the positive signal and the negative signal amplified by the differential amplifiers 50 in steps S1 and S2. The low pass filter 52 removes a radio frequency noise from each of the positive signal and the negative signal received from the differential amplifiers 50 and outputs the positive signal and the negative signal, from which the radio frequency noise is removed, to the pre-amplifier 54. The pre-amplifier 54 samples a magnitude difference (or an amplitude) of each of the positive signal and the negative signal received from the low pass filter 52 and amplifies the sampled voltage in step S3. Then, the pre-amplifier 54 outputs the amplified voltage to the integrator 56. If the output of the differential amplifiers 50 is directly input to the pre-amplifier 54 without passing through the low pass filter 52, the radio frequency noise as well as the signal component is amplified by the pre-amplifier 54. Hence, an improvement effect of the signal-to-noise ratio is reduced. Thus, only the signal passing through the low pass filter 52 has to be input to the pre-amplifier 54. Hence, only the signal component is amplified without the radio frequency noise applied to the Tx line. As a result, the signal-to-noise ratio increases.

The integrator 56 accumulates the positive signal and the negative signal, which are amplified by the pre-amplifier 54 and are sequentially input, N times and adds the accumulated signals, thereby gradually increasing the voltage of each signal. The integrator 56 supplies the finally accumulated signal voltage to the sampling circuit 58 in step S4. In FIG. 7, N is 4, but is not limited thereto. If N decreases, an amplification effect of the signal voltage decreases. However, a touch report rate increases. On the other hand, if N increases, the amplification effect of the signal voltage increases. However, the touch report rate decreases. The touch report rate indicates the number of transmitted touch coordinate values per second. Thus, N is a positive integer equal to or greater than 2 and has to be properly selected in consideration of the amplification effect of the signal voltage and the touch report rate.

The sampling circuit 58 samples the signal voltage received from the integrator 56 in step S5. The analog to digital converter 60 converts the voltage sampled by the sampling circuit 58 into digital data and generates the touch raw data Tdata to be transmitted to the touch recognition algorithm execution unit 30. In FIG. 7, 'SHA' indicates a circuit including the sampling circuit 58 and the analog to digital converter 60.

Figure 8:
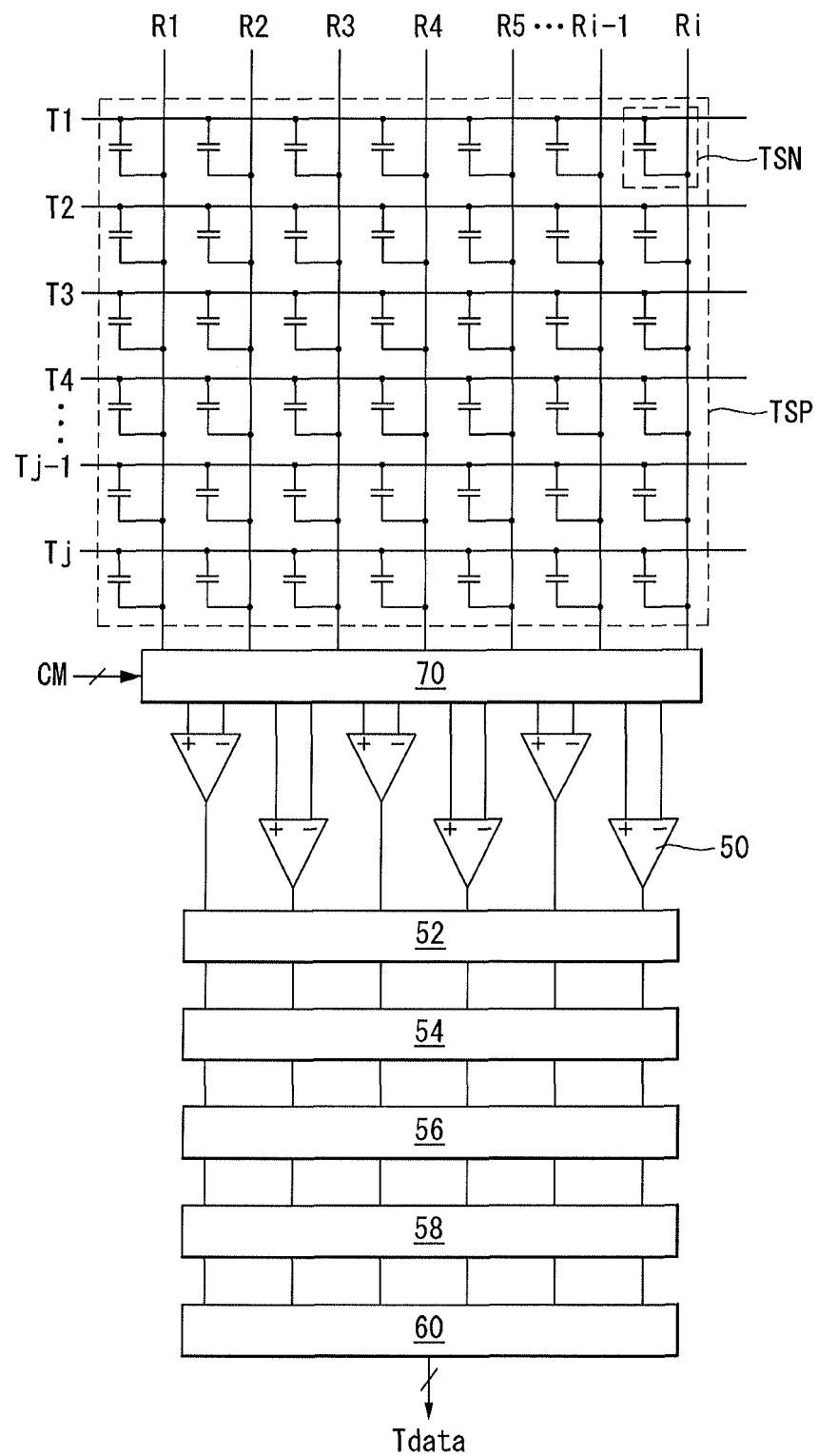
FIG. 8 is a block diagram of a touch screen sensing device according to another example embodiment of the invention.
Figure 9A:
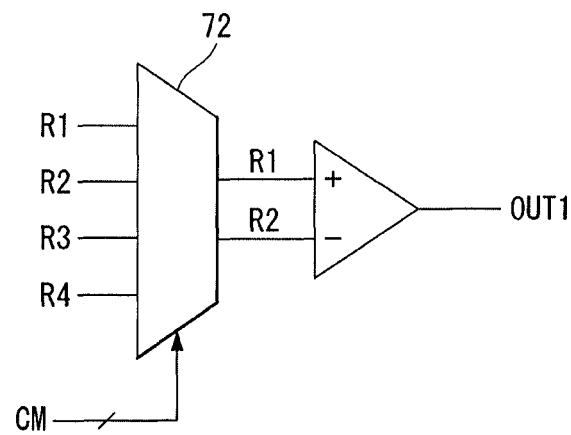
FIGS. 9A and 9B illustrate a partial circuit configuration of a multiplexer array shown in FIG. 8.
Figure 9B:
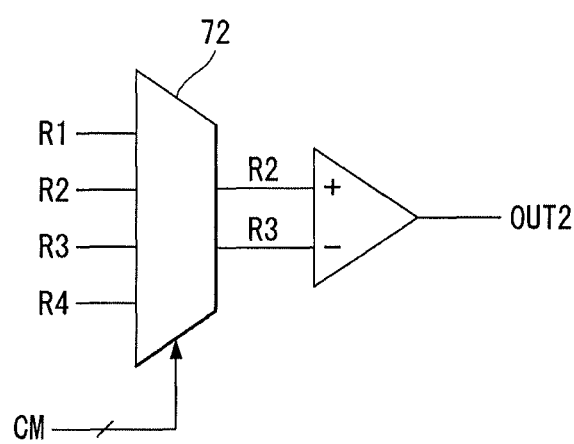

FIG. 8 is a block diagram of a touch screen sensing device according to another example embodiment of the invention. FIGS. 9A and 9B illustrate a partial circuit configuration of a multiplexer array shown in FIG. 8.

As shown in FIG. 8, the touch screen sensing device according to the embodiment of the invention further includes a multiplexer array 70 between Rx lines R1 to Ri and differential amplifiers 50.

The multiplexer array 70 time-divides voltages of touch sensors received through the Rx lines R1 to Ri in response to a multiplexer control signal CM received from a TSP timing controller 36, thereby reducing the number of Rx channels of an Rx driving circuit 34. For example, the multiplexer array 70 may operate in a manner shown in FIGS. 9A and 9B. As shown in FIGS. 9A and 9B, a multiplexer 72 inputs first and second touch sensor voltages received through the first and second Rx lines R1 and R2 to the first differential amplifier 50 during a first frame period, and then inputs second and third touch sensor voltages received through the second and third Rx lines R2 and R3 to the first differential amplifier 50 during a second frame period. Thus, the multiplexer 72 may reduce the number of Rx channels of the Rx driving circuit 34 to one half of the number of Rx lines.

In another embodiment, when the 44 Rx lines are used, the multiplexer array 70 time-divides signals received through the 44 Rx lines in response to the multiplexer control signal CM into four parts, each of which includes 11 signals, and inputs the signals to the differential amplifiers 50. In this instance, the multiplexer array 70 time-divides the signals received through the 44 Rx lines four times during four frame periods, and thus may reduce the number of Rx channels of the Rx driving circuit 34 to one-fourth of the number of Rx lines.

As described above, the embodiments of the invention differentially amplify the signal voltages of the touch sensors received through the Rx channels of the touch screen and then sequentially perform the radio frequency noise removing process, the amplification process, and the integration process, thereby increasing the signal-to-noise ratio of the signal received through the Rx channels and increasing the accuracy of the touch recognition.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen sensing device comprising:
a touch screen including Tx lines, Rx lines crossing the Tx lines, and touch sensors formed at crossings of the Tx lines and the Rx lines;
a touch screen panel (TSP) timing controller configured to generate a Tx setup signal for setting a Tx channel, a Rx setup signal for setting a Rx channel, and timing control signals for controlling operation timings;
a Tx driving circuit configured to select a Tx channel connected to each of the Tx lines in response to the Tx setup signal and supply a driving pulse to each of the Tx lines N times, where N is a positive integer equal to or greater than 2; and
an Rx driving circuit configured to select a Rx channel connected to each of the Rx lines in response to the Rx setup signal, receive a signal voltage from the Rx line, sample the signal voltage of the touch sensors received through the Rx lines and convert the sampled signal voltage into digital data, wherein the Rx driving circuit includes:
 a plurality of differential amplifiers, each directly connected to two of the Rx lines which are adjacent to each other to differentially amplify signals received through the two of the Rx lines and output a positive signal and a negative signal having a potential difference corresponding to a difference between the signal voltages from the two of Rx lines
 wherein each differentially amplified signal is processed through:
 a low pass filter configured to remove a radio frequency noise from the positive signal and the negative signal output of the differential amplifiers;
 an amplifier configured to amplify the positive signal and the negative signal from the low pass filter; and
 an integrator configured to accumulate the positive signal and the negative signal which are successively output from the amplifier.

2. The touch screen sensing device of claim 1, wherein the Rx driving circuit further includes:
a sampling circuit configured to sample an output of the integrator; and
an analog to digital converter configured to convert the signal voltage sampled by the sampling circuit into digital data.

3. The touch screen sensing device of claim 2, wherein the differential amplifiers, the low pass filter, the amplifier, and the sampling circuit each include a fully differential amplifier, which inputs and outputs voltages of a positive signal and a negative signal.

4. A method for sensing a touch screen including Tx lines, Rx lines crossing the Tx lines, and touch sensors formed at crossings of the Tx lines and the Rx lines, the method comprising:
generating a Tx setup signal for setting a Tx channel, a Rx setup signal for setting a Rx channel, and timing control signals for controlling operation timings;
selecting a Tx channel connected to each of the Tx lines in response to the Tx setup signal and supplying a driving pulse to each of the Tx lines N times, where N is a positive integer equal to or greater than 2;
an Rx channel connected to each of the Rx lines in response to the Rx setup signal;
the Rx channel amplifying signals using a differential amplifier always connected to each Rx line and an immediately adjacent Rx line so as to form pairs;
outputting a positive signal and a negative signal from the differential amplifier having a potential difference corresponding to a difference between the signals from the two of Rx lines of the pair of Rx lines;
removing a radio frequency noise from the positive signal and the negative signal output of a differential amplifier using a low pass filter;
amplifying the positive signal and the negative signal from the low pass filter; and
successively receiving the differentially amplified signals of the pair of Rx lines to accumulate the amplified signals.

5. The method of claim 4, further comprising:
sampling an accumulated integration output; and
converting a sampled signal voltage into digital data.

6. The method of claim 4, wherein the differential amplifier is directly connected to each Rx line and the immediately adjacent Rx line.

* * * * *